No. 650,149. Patented May 22, 1900.
F. A. HOWARD.
WEATHER INDICATING DEVICE.
(Application filed Sept. 20, 1899.)
(No Model.)

Witnesses.
Thomas J. Drummond,
Adolf C. Kaiser.

Inventor.
Fred A. Howard,
by Crosby Gregory attys.

UNITED STATES PATENT OFFICE.

FRED A. HOWARD, OF EASTON, MASSACHUSETTS, ASSIGNOR OF ONE-HALF TO C. V. KEITH, OF BROCKTON, MASSACHUSETTS.

WEATHER-INDICATING DEVICE.

SPECIFICATION forming part of Letters Patent No. 650,149, dated May 22, 1900.

Application filed September 20, 1899. Serial No. 731,055. (No model.)

*To all whom it may concern:*

Be it known that I, FRED A. HOWARD, a citizen of the United States, residing at Easton, in the county of Bristol, State of Massachusetts, have invented an Improvement in Weather-Indicating Devices, of which the following description, in connection with the accompanying drawings, is a specification, like letters on the drawings representing like parts.

This invention relates to weather-indicating devices; and it has for its object the production of a simple, cheap, and attractive article which can be readily used in connection with advertising matter, if desired, and which by means of a color-index shows at a glance the nature of the weather indication.

Figure 1:
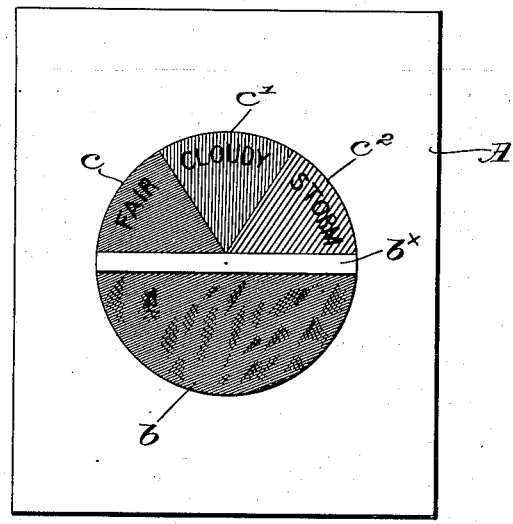
Figure 2:
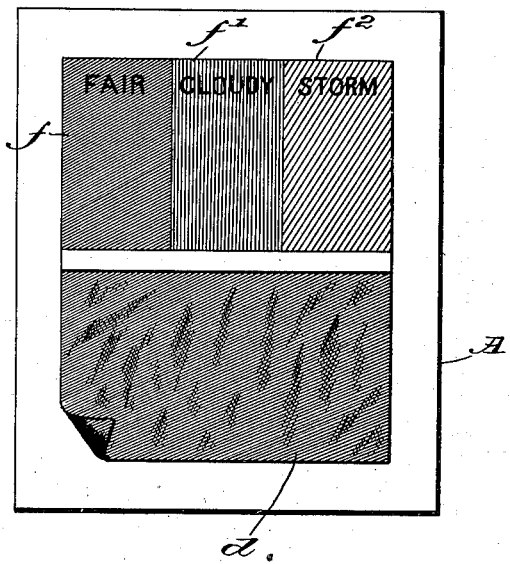

Figure 1 is a plan view of a weather-indicating device embodying one form of my invention, and Fig. 2 is another embodiment of my invention.

My invention consists in an indicator, which is a piece of suitable material, such as cloth or paper, impregnated with a solution of chlorid of cobalt, and an accompanying color-index, the latter consisting of a plurality of divisions or panels severally colored to correspond to the various colors assumed by the indicator under different conditions of the weather, so that an instant's comparison of the indicator and color-index will disclose the weather condition.

Referring to Fig. 1, a card, board, or other suitable support A has attached to it a piece of material $b$, such as paper or cloth, impregnated with a solution of chlorid of cobalt and shown in Fig. 1 as semicircular in shape, attached at $b^\times$ along the straight side to the support A. Immediately adjacent the indicator $b$ is located the color-index, consisting of a plurality of panels $c$ $c'$ $c^2$, shown as sectors to complete the semicircle, the panels being severally colored to correspond to the color assumed by the indicator under different conditions of the weather—that is, the panel $c$ would be blue, indicating fair weather, panel $c'$ light blue-gray, and panel $c^2$ pink, said colors when assumed by the indicator $b$ denoting fair weather, change, and storm, respectively.

By making a figure of definite symmetrical shape with the indicator and color-index a very attractive appearance is given to the device, and it is simple, cheap to manufacture, and very easily read.

In Fig. 2 the general figure is a rectangle, the indicator $d$ being oblong and equal to substantially one half of the figure, the other half being divided into three equal and symmetrical panels $f$ $f'$ $f^2$, colored blue, blue-gray, and pink, respectively, but the panels are oblong instead of sectors, as in Fig. 1.

If desired, the words "Fair," "Change," and "Storm" may be delineated on the several panels, as shown.

Obviously the shape of the panels and indicator is not restricted to that herein shown, for any arrangement and shape may be used, provided a color-index is used in connection with the indicator, said index being composed of a plurality of contrasted colors corresponding severally to the colors assumed by the indicator under different conditions of the weather.

Having fully described my invention, what I claim as new, and desire to secure by Letters Patent, is—

1. A weather-indicating device consisting of a chemically-prepared indicator, and an adjacent color-index composed of a plurality of contrasted colors to correspond respectively to the several colors assumed by the indicator under different conditions of the weather.

2. A weather-indicating device consisting of a card, a chemically-prepared piece of material secured thereto, and a color-index on the card adjacent the edge of the said material, the index being composed of a plurality of panels severally colored to correspond to the different colors assumed by the material in fair, cloudy and stormy weather.

3. A weather-indicating device consisting of a card, a chemically-prepared semicircular piece of material secured thereto, and a plurality of adjacent sector-shaped panels colored to correspond to the various colors assumed by the material under different conditions of the weather, the panels and piece of material together constituting a circular figure displayed upon the card.

In testimony whereof I have signed my name to this specification in the presence of two subscribing witnesses.

FRED A. HOWARD.

Witnesses:
JOHN C. EDWARDS,
EMMA J. BENNETT.